United States Patent

Mizobuchi et al.

[15] 3,668,635

[45] June 6, 1972

[54] DIGITAL OPTICAL PATTERN TRANSFORMATION SYSTEM WITH OPTICAL MEMORIES

[72] Inventors: Yasuo Mizobuchi, Yokohama; Isao Hoshino, Tokyo, both of Japan

[73] Assignee: Tokyo Shibaura Electric Co., Ltd., Kawasaki-shi, Japan

[22] Filed: June 22, 1970

[21] Appl. No.: 48,069

[30] Foreign Application Priority Data

| | | |
|---|---|---|
| June 20, 1969 | Japan | 44/48325 |
| Aug. 21, 1969 | Japan | 44/65683 |
| Jan. 16, 1970 | Japan | 45/3795 |
| Jan. 16, 1970 | Japan | 45/3796 |
| June 11, 1970 | Japan | 45/49860 |

[52] U.S. Cl. .......... 340/146.3 P

[51] Int. Cl. .......... G06r 9/00

[58] Field of Search .......... 340/146.3 P, 146.3

[56] References Cited

UNITED STATES PATENTS

| | | | |
|---|---|---|---|
| 2,770,166 | 11/1956 | Gabor | 340/146.3 P |
| 3,064,519 | 11/1962 | Shelton | 340/146.3 P |
| 3,195,396 | 7/1965 | Horwitz et al. | 340/146.3 P |
| 3,196,392 | 7/1965 | Horwitz et al. | 340/146.3 P |
| 3,408,656 | 10/1968 | Lamberts et al. | 340/146.3 P |

*Primary Examiner*—Thomas A. Robinson
*Attorney*—Flynn & Frishauf

[57] ABSTRACT

A digital optical pattern transformation system includes memories coupled in the form of a matrix into which there are introduced parallel light beams carrying digital information. The output light beams obtained from the memory pattern under a certain rule of transformation are conducted to an output information detector, to generate a given digital output information therein.

7 Claims, 20 Drawing Figures

FIG. 4

| TYPE | MATRIX-ELEMENT OF INPUT I | TRANSFORMATION RULE IN $M_{ij}$ | MATRIX-ELEMENT OF OUTPUT O |
|---|---|---|---|
| BRIGHTNESS OUTPUT | $I_{ij} = 1$ ( BRIGHT ) | POSITIVE-MODE | $O_{kl} = 1$ ( BRIGHT ) |
| | $I_{ij} = 0$ ( DARK ) | | $O_{kl} = 0$ ( DARK ) |
| DARKNESS OUTPUT | $I_{ij} = 1$ ( BRIGHT ) | NEGATIVE-MODE | $O_{kl} = 0$ ( DARK ) |
| | $I_{ij} = 0$ ( DARK ) | | $O_{kl} = 1$ ( BRIGHT ) |

Table Fundamental Rule of Transformation.

Output Patterns for Each Input

DIGITAL OPTICAL PATTERN TRANSFORMATION SYSTEM WITH OPTICAL MEMORIES

The present invention relates to an information transformation system and more particularly to a digital optical pattern transformation system for producing output signals corresponding to input signals using optical memories.

There have been proposed numerous devices for transforming into modified optical patterns or machine-language-patterns not only letters, configurations, photographs and the like which originally have optically reproducible forms, but also various signals already converted to optically reproducible forms. Typical is the device of D. Gabor based on the principle of holography.

The prior art transformation device had the drawbacks that there had to be used, as is well known, an analog type optical pattern, limiting the scope of information usable as input signals, and the transmission medium always had to consist of coherent light beams such as those available from a laser, with the resultant complication of the apparatus. Further, use of the aforesaid analog inputs failed to obtain clearly distinguishable outputs.

The object of the present invention is to provide a digital optical pattern transformation system which eliminates the necessity of using analog signals as the input, thus broadening the scope of information available as input signals, produces distinct output signals and further permits a transmission medium to consist of other than coherent light beams, simplifying the entire apparatus, if required.

SUMMARY OF THE INVENTION

According to one aspect of the present invention, there is provided a digital optical pattern transformation apparatus with optical memories comprising an input information pre-preprocessor for transforming input information to digital signals; a light source controller for emitting simultaneously multiple light beams corresponding to the digital signals; an optical memory device including a memory array which forms simultaneously plural optical patterns, each of which corresponds to the radiance condition of each of said multiple light beams; and an output information detector for photo-electrically detecting the light intensity of each bit of the read out patterns which are produced, so as to allow them to be mutually superposed and generating an output comprising the corresponding digitalized parallel signals.

In another aspect of the invention, there io provided a digital optical pattern transformation system with optical memories comprising an input information pre-processor for receiving optical patterns consisting of incoherent light beams and generating digital electric signals according to the optical patterns received; a light source controller for producing multiple coherent light beams form light sources arranged in the matrix from in a number of $m \times n$ according to the digital electric signals from said pre-processor; an optical memory device for producing plural patterns from a memory array comprised of plural holograms arranged in the matrix form when there are projected multiple coherent light beams generated by the light source controller; and an output information detector for photoelectrically detecting the light intensity of each bit of the read out patterns produced by the optical memory array so as to cause the origins thereof to be superimposed on each other and generating a given digital output information.

This invention can be more fully understood from the following detailed description when taken in connection with the accompanying drawings, in which:

FIG. 2A is an input pattern, FIG. 2B is an array of memories and FIG. 2C is an output pattern;

Figure 3:
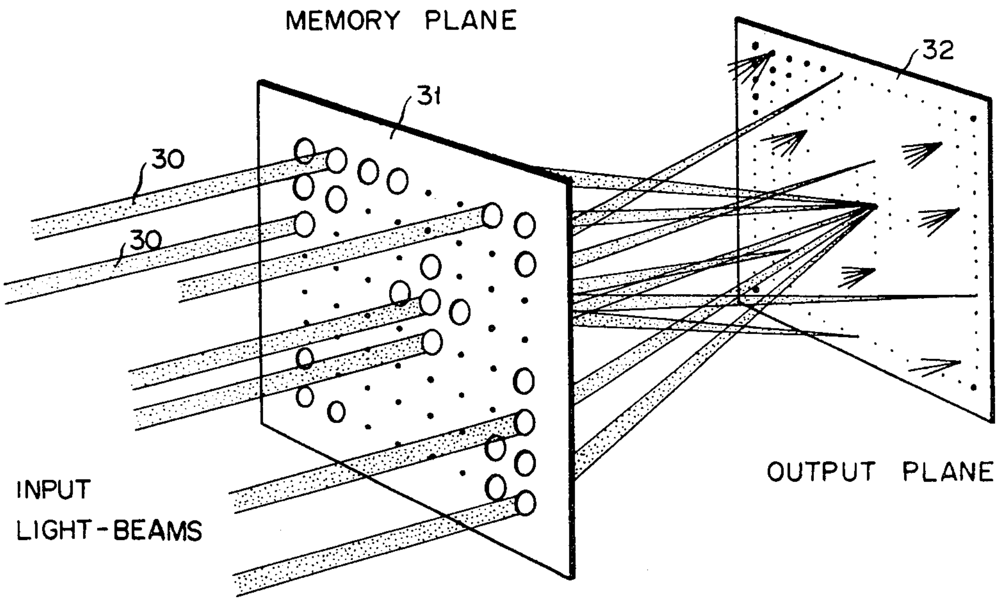
Figure 2:
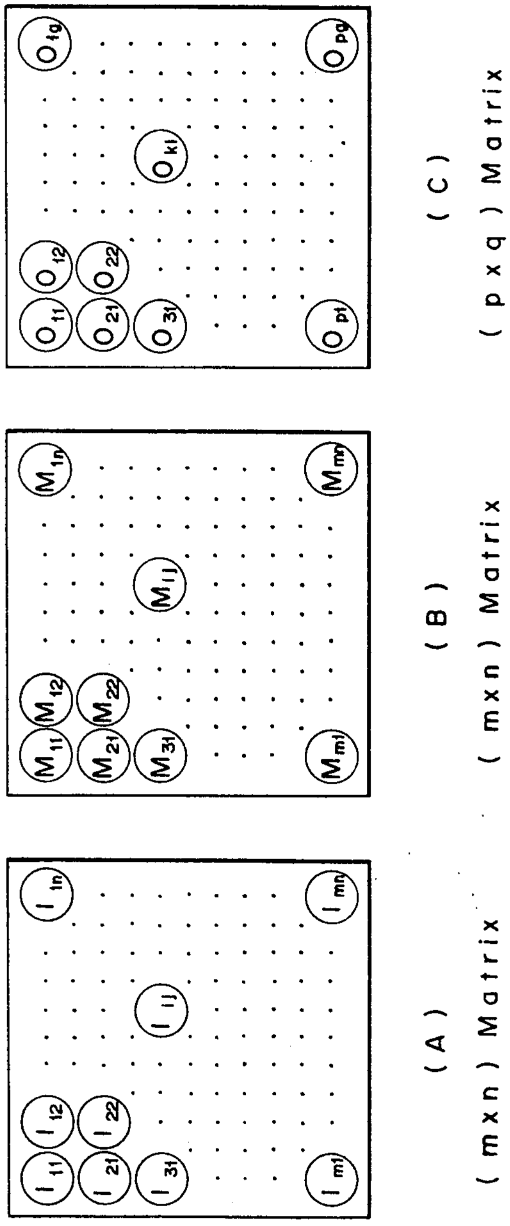
FIG. 2 is a diagram of the pattern matrices used in the device of FIG. 1.
Figure 5:
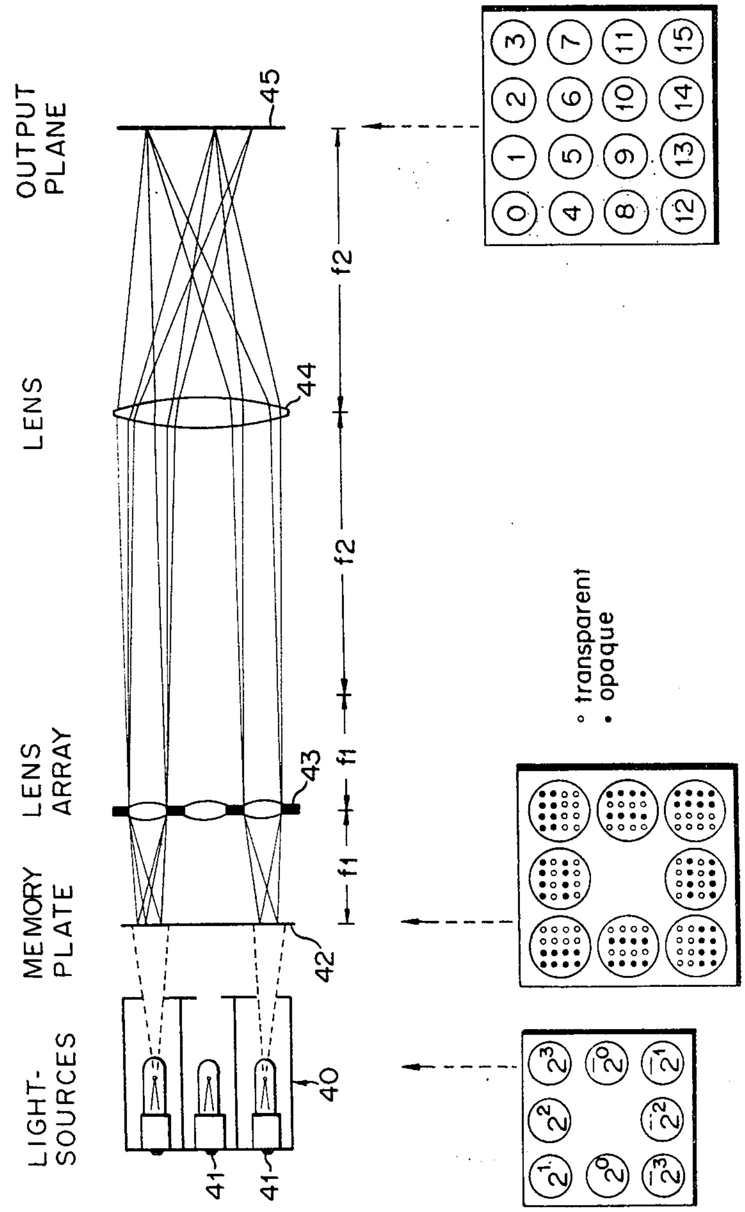
Figure 6:
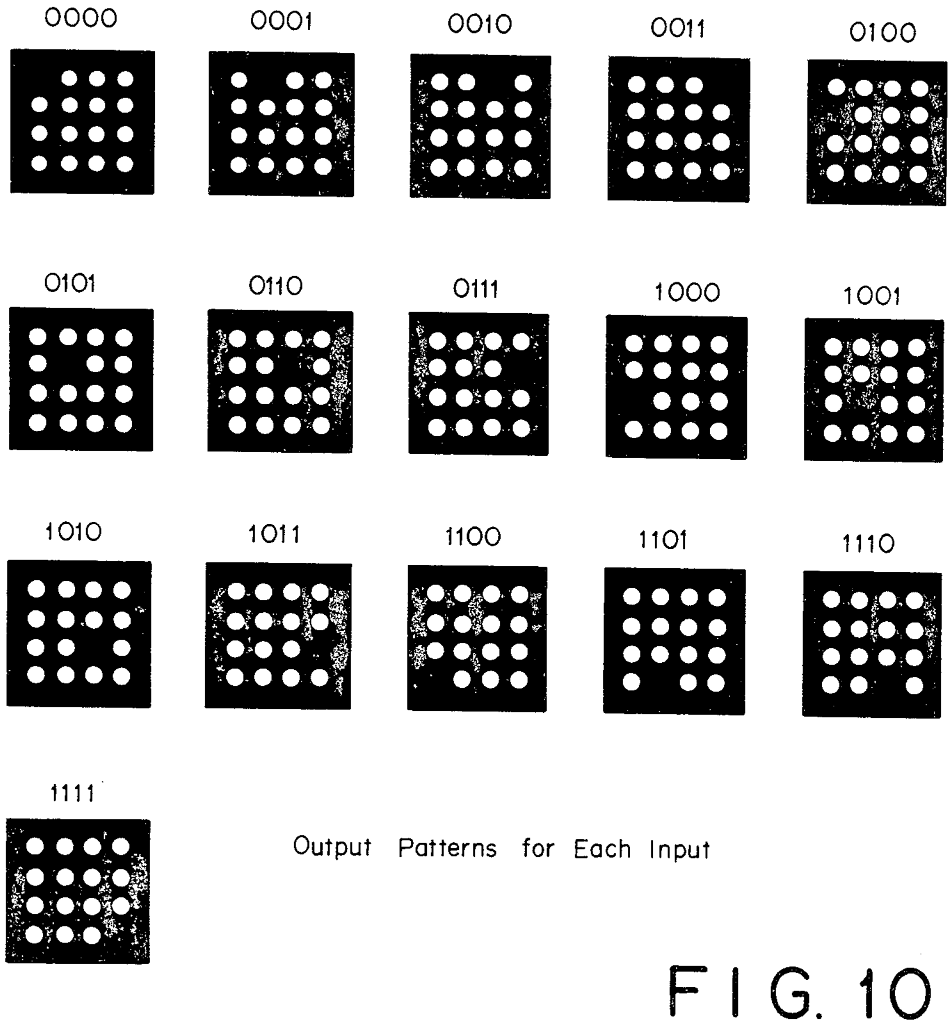
Figure 10:
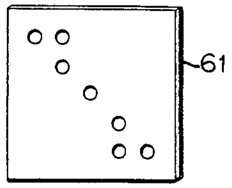
Figure 16:
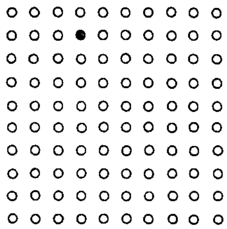
Figure 7:
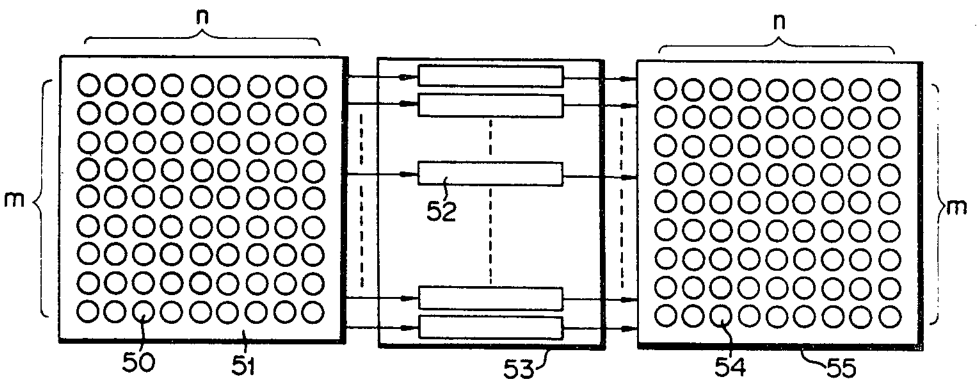
Figure 8:
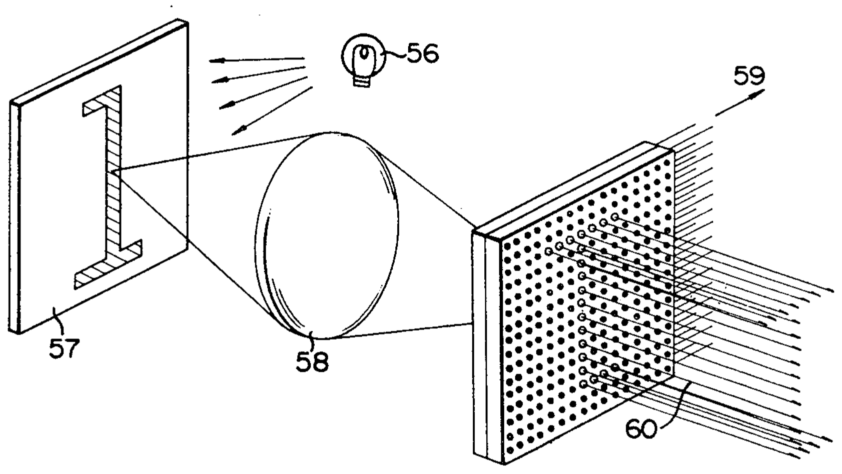
Figure 9:
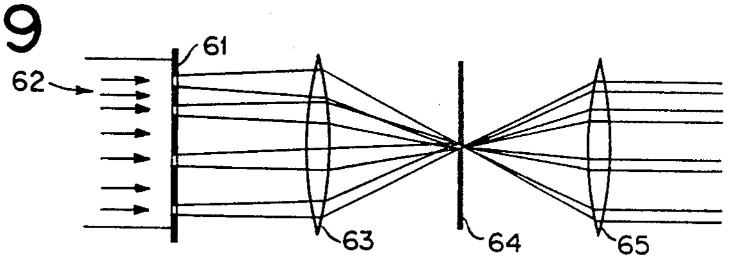
Figure 15:
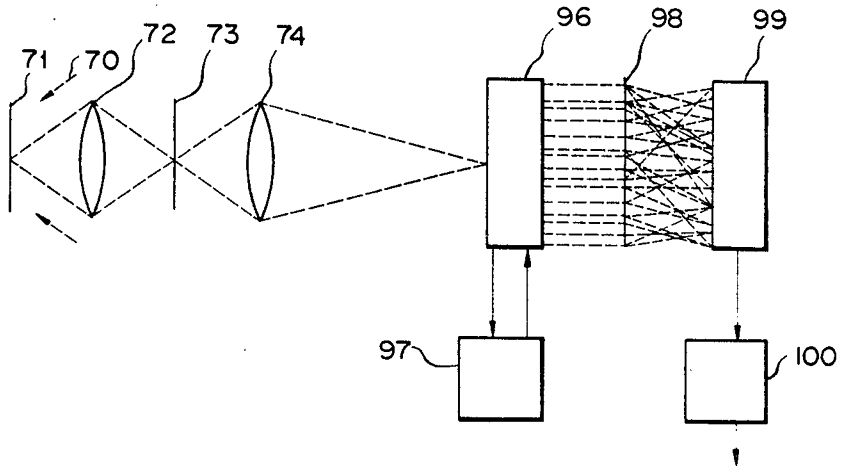
Figure 17:
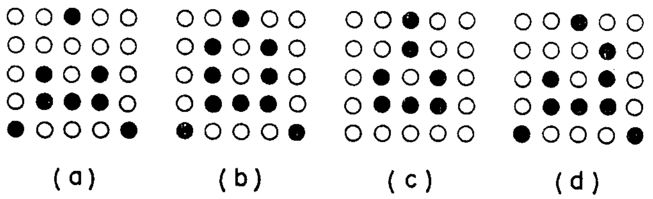
Figure 11:
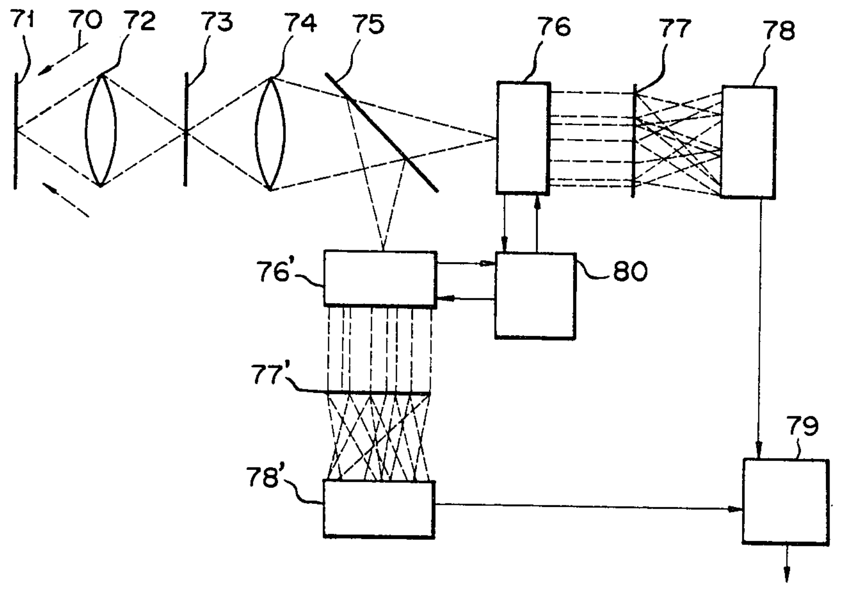
Figure 12:
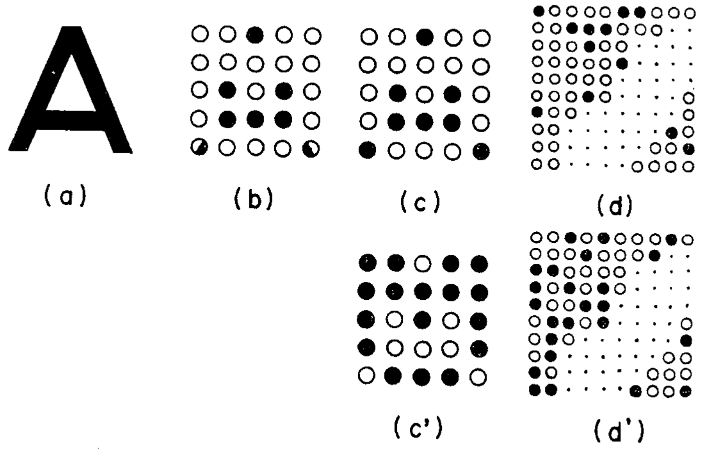
Figure 13:
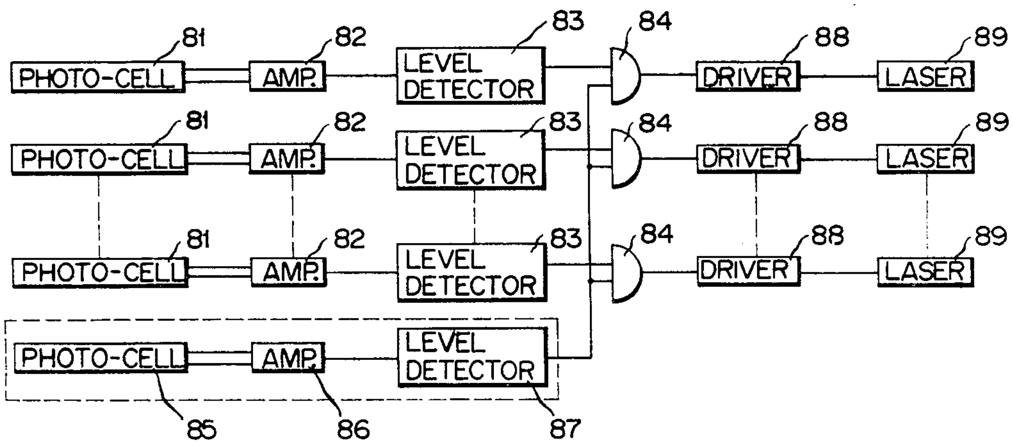
Figure 14:
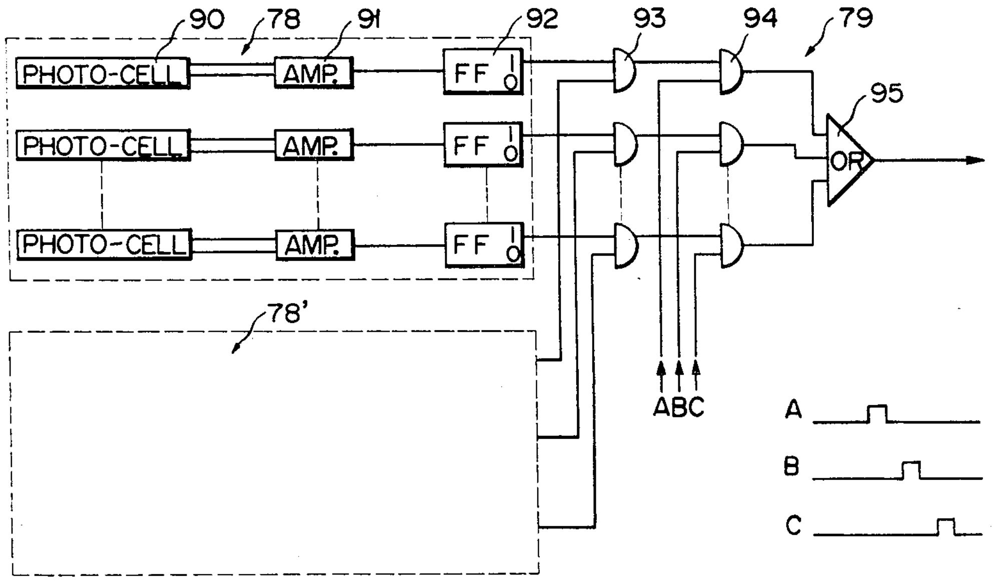

FIG. 3 denotes a memory pattern and an output pattern, or a scheme of the optical pattern transformation system of the invention;

FIG. 4 is a table showing two forms of the fundamental rule of said optical pattern transformation;

FIG. 5 schematically illustrates a digital optical pattern transformation system according to another embodiment of the invention, together with various patterns associated therewith;

FIG. 6 illustrates various output patterns obtained from the system of FIG. 5;

FIG. 7 is a concrete example of a light source controller or an incoherent-coherent converting apparatus suitable for use in the foregoing embodiment;

FIG. 8 is a perspective view of the apparatus of FIG. 7;

FIG. 9 illustrates another concrete example of the light source controller included in the digital optical pattern transformation system of the invention;

FIG. 10 is a plan view of an information carrier having optical gates according to input information associated with the apparatus of FIG. 9;

FIG. 11 is a digital optical pattern transformation system according to still another embodiment of the invention;

FIG. 12 presents typical optical patterns associated with key steps of transformation system of FIG. 11;

FIG. 13 is a circuit diagram involving the incoherent-coherent converting device or electronic circuit device of the transformation system of FIG. 11;

FIG. 14 is a circuit diagram of an output information detector used in the transformation system of FIG. 11;

FIG. 15 is a schematic illustration of a digital optical pattern transformation system according to a further embodiment of the invention;

FIG. 16 illustrates an output optical pattern obtained from the transformation system of FIG. 15; and FIG. 17 illustrates modifications of the pattern (c) of FIG. 12.

There will now be described to an embodiment of the present invention with reference and FIGS. 1 to 4.

Figure 1:
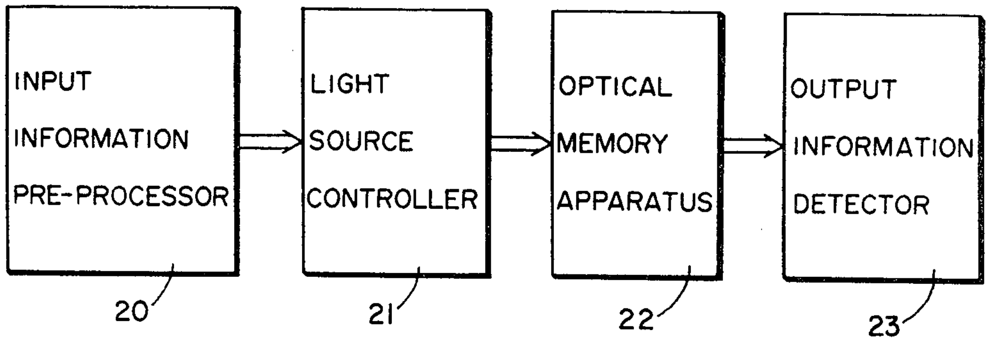
FIG. 1 is a block diagram schematically illustrating a digital optical pattern transformation system according to an embodiment of the present invention.

The digital optical pattern transformation system with optical memories of the present invention shown in FIG. 1 fundamentally comprises an input information pre-processor 20, light source controller 21, optical memory apparatus 22 and output information detector 23. The input information pre-processor 20 converts information associated with, for example, letters, configurations and block-signals of other types to digital parallel signals adapted for control of a light source according to the form of said information in which it is used as an input. This pre-processor 20 permits adoption of various means, that is, (A) where information consists of electrical signals, there may be used a means for digitalizing them into electric parallel signals, (B) where input information is of the incoherent optical type, there may be employed means for digitalizing it into electric parallel signals and (C) there may be applied another means for forming complement signals for the input information.

The light source controller 21, upon receipt of signals from the pre-processor 20, emits multiple light beams corresponding to said signals from the light source members arranged in the matrix form in a number of $m \times n$ or from those disposed at pre-determined positions. Typically, where there are to be received signals described in the aforesaid case (A) or (B), it is possible to use means prepared by arranging laser beam emitting members in the matrix form, for example, a laser element array or means prepared by setting a large number of incoherent light beams in the matrix form, for example, an array involving ordinary light sources such as midget lamps. With complement signals described in case (C), there may be employed a complement array. Of course, said complement signals permit use of both incoherent and coherent light beams.

The aforementioned optical memory apparatus 22 consists of memories corresponding to multiple beams from the light source controller 21 arranged in the matrix form in a number of $m \times n$ and there are simultaneously read out patterns stored in memories in accordance with a certain rule of transformation by these beams. The typical forms of said apparatus now adopted include a coherent memory apparatus using holograms when there are to be received coherent light beams, and an incoherent type using a microfilm and lens array where there are to be received incoherent light beams. In the case where beams for complement signals are supplied, there are employed complement memories.

The above-mentioned output information detector 23 receives output optical patterns read out of the memory apparatus 22 so as to cause the origins thereof to be superposed on each other and photoelectrically converts the resultant composite patterns into digital parallel signals having a number of $p \times q$ to obtain output information.

There will now be described the operation of the present transformation system in greater detail. The content of the memory is prepared under a program meeting a given objective in accordance with the diagram of FIG. 4 showing the fundamental rule of transformation. This rule is broadly divided into two forms. According to the first form, there are obtained from the matrix element Mij of the memory, output patterns constructed by the elements Okl whose state exactly correspond to those of the input pattern matrix element Iij. According to the other form of the rule, there are derived, from the matrix element Mij of the memory, output patterns constructed by the elements Okl whose states are opposite to those of the input pattern matrix Iij. Combining of these two forms of the rule will permit the formulation of further complicated rules of transformation. In this case, the manner in which the input pattern matrix element Iij is made to contribute to a desired output pattern element Okl should be determined according to the object and application involved.

There will now be described with reference to FIGS. 5 and 6 digital optical pattern transformation system according to another embodiment of the present invention. The system shown in FIG. 5 is an example of the application of this invention to a so-called "DECODER," which has four figures of binary codes. The patterns shown in FIG. 6 are the optical output or decoded patterns processed in the system of FIG. 5. Parallel bits or signals expressed in binary codes are converted by the inversion and amplification circuits of an input information pre-processor (not shown) into simply amplified parallel bit signals and those reversed with respect to the binary codes, namely complement signals. Both forms of signals are conducted to the prescribed ones of eight midget lamps 41 which are arranged in the matrix form to contribute a light source 40. Accordingly, the signals will form through said light source 40 an input pattern composed of 8 bits corresponding to four figures of binary codes and their complements indicated by a bar (FIG. 5). The aforesaid light source 40 is provided with an electric circuit so arranged that when the prescribed bits of the input pattern turn on the corresponding lamps, those associated with the complement bits to the prescribed ones are not illuminated. Thus a group of signal beams involving parallel bits and complements thereto emitted from the light source 40 is conducted to a memory plate. Contents of memories, the details of which are shown below the transformation system of FIG. 5, are recorded on a photographic plate 42 in the form of micro-images.

In the embodiment of FIG. 5, this photographic plate 42 consists of microfilm. However, where the light source used is of a type emitting coherent light beams such as laser beams, there may be employed a hologram. The information recorded on the memory plate 42, combined with the input information comprising normal and complement bits, constitutes output data. Such output data from several memories are superposed through a lens array 43 and a lens 44 to give a final output pattern on an output plane 45. The output pattern has 16 bits ($=2^4$), each of which was addressed beforehand for each input information. As the output used in this embodiment is of a darkness output type, the bit corresponding to the input represents the dark spot in the output plane. Output patterns presented on the output plane include 16 forms shown in FIG. 6 according to the input pattern.

The focal length of the lens array 43 (FIG. 5) is $f_1$ and that of the lens 44 is $f_2$. The memory plate 42, lens array 43, lens 44 and output plane 45 are arranged in such relationship as given in FIG. 5.

Where a system uses coherent light beams and hologram memories, and the input information to be processed is an incoherent optical pattern such as a letter printed on paper, it is only required to use an incoherent-coherent converting apparatus illustrated in FIGS. 7 and 8 as a light source controller. Numeral 50 of FIG. 7 represents photoelectric light conversion elements, for example, semiconductor light receiving elements (hereinafter referred to as "light receiving elements") for digitalizing optical patterns formed by incoherent light beams (not shown). Numeral 51 denotes an array panel in which there are arranged said elements 50 in the matrix form in a number of $m \times n$. Numeral 52 designates an electronic circuit provided for each of said light receiving elements 50, and consisting of, for example, an analog-to-digital converter and drive circuit. Numeral 53 is a multi-channel electronic circuit in which there are disposed the aforesaid electronic circuits 52 in sufficient number, for example, $m \times n$ to match the number of the matrix elements of the array panel 51. Numeral 54 denotes light emitting elements, for example, laser elements provided for each electronic circuit 52 involved in the multi-channel electronic circuit 53. Numeral 55 is an array panel in which there are arranged said laser elements 54 in a number of, for example, $m \times n$, that is, in the same number as the light receiving elements 50 set on the array panel 51.

With the aforesaid arrangement, optical patterns consisting of incoherent light beams are converted to digitalized incoherent optical patterns by the light receiving elements 50 of the array panel 51, the light quantity of the light receiving elements 50 being converted to an electric signal. Each of the electronic circuits 52 of the multi-channel electronic circuit 53 provided for the respective light receiving elements 50 gives forth a prescribed output electric signal only when the output from the light receiving element 50 exceeds a preset value. Electric signals obtained in each channel are supplied to a laser element 54 associated therewith, generating a laser output, or coherent light beams corresponding to said electric signals.

There will now be described the manner in which there is employed the light source controller. Referring to FIG. 8, numeral 56 denotes an ordinary light source emitting incoherent light beams. Numeral 57 is a foreground object such as a letter printed on a recording medium, for example, a sheet of paper, 58 an imaging lens for focusing the image of the foreground object 57, 51 an array panel in which there are arranged light receiving elements 50, 55 an array panel in which there are set laser elements 54, 59 lead lines connected to the electronic circuit 53 and 60 an optical pattern consisting of coherent light beams corresponding to the incoherent optical pattern of the foreground object 57.

With the aforesaid arrangement, the foreground object 57, for example, letters printed on paper, when illuminated, for example, by the ordinary light source 56, has its image focused on the array panel 51 in which there are arranged the light receiving elements 50. The multi-channel electric signals corresponding to the incoherent optical pattern of the foreground object 57 produce a prescribed output only when the output from the electronic circuit 53 exceeds a preset value. Said prescribed output is conducted to the corresponding laser elements 54 disposed on the array panel 55. The group of coherent light beams released from the laser elements 54 forms an optical pattern corresponding to the original optical pattern 57.

There has been described above a light source controller which receives multiple light beams. However, there may be used the type into which there is introduced a single light beam shown in FIG. 9.

A light switching member 61, for example, a punched card or paper tape which is caused to carry prescribed information by the input information pre-processor is brought of a light beam 62. Light beams 62 from the light source (not shown) pass through the prescribed apertures perforated in the light-switching member 61, constituting multiple beams corresponding to the information stored therein and are conducted to a first collimation lens 63 which focuses them at an aperture 64. After leaving the aperture 64, the beams are brought to a second collimation lens 65 whereby they are formed into parallel beams. These parallel beams are used as input signals for the memory apparatus.

There will not be described by reference to FIGS. 11 to 14 a digital optical pattern transformation system according to another embodiment of the present invention. The system shown in FIG. 11 is an example of an application of this invention to a so-called "Optical Character Reader." When illuminated by beams 70 from an ordinary incoherent light source, a foreground object 71, for example, a letter printed on paper to be later identified is focused by a lens 72 on a mask 73, for example, perforated with small apertures in the matrix form as a preparatory step for spatial quantization (mosaic formation). After leaving the apertures, the optical pattern of the foreground object 71 is focused on an incoherent-coherent optical pattern conversion means 76 by a lens 74 after passing through a beam splitter 75, for example, a half-mirror. Said conversion means 76 is so designed as to generate coherent light beams only when the bits of the quantized incoherent optical pattern display a brightness exceeding a predetermined value, obtaining a group of beams associated with all the bits of a pattern thus produced, or spatially quantized optical signals. When these optical signals are introduced into a holographic optical memory 77, its optical pattern transforming action causes a foreground object such as letters and configurations to be presented on a photoelectric conversion plane 78 (output plane) in the form of an optical pattern of machine language according to the programming of data patterns stored in an optical memory. This machine language pattern is a quantized digital optical pattern wherein only the bit (generally in plurality) specified by the input does not brighten whereas the other bits have varying degrees of brightness. On the other hand, that portion of the incoherent light beams which is reflected by the beam splitter 75 is processed by another train of units 76', 77' and 78' corresponding to the first mentioned units 76, 77 and 78 substantially in the same manner as performed by the latter, excepting that the incoherent-coherent pattern conversion means 76' is so designed as to generate coherent light beams with respect to the bits of the incoherent pattern only when the brightness of said bits falls below a prescribed value. Also the holographic optical memory 77' stores the signals reversed from those stored in the holographic memory 77. Parallel bit electrical signals from 78 and 78' pass through the AND logical process of an identification electronic circuit 79 to determine the kind of the originally introduced input. Numeral 80 is an electronic circuit for the incoherent-coherent pattern conversion means 76 and 76'.

In this particular field, there are used various types of incoherent-coherent optical pattern conversion means and electronic circuits therefor, the unit shown, for example, in FIG. 13 being typical. Referring to this figure, numeral 81 denotes photo cells into which there are introduced beams from the beam splitter 75. The cell 81 converts the beams received to electric signals, which are then amplified by an amplifier 82. Only those of the electric signals which have a prescribed magnitude are selectively supplied to an AND gate 84. On the other hand, photo cells 85 provided separately from the aforementioned incoherent-coherent optical pattern conversion means 76 and 76' so as to read out the initial or prescribed portion of information convert the beams received therein to electrical signals, which are conducted to the AND gate 84 through an amplifier 86 and level detector 87. When these input signals and those from the photo cell 81 are timed at the AND gate 84, then the resultant outputs are conducted to drivers 88 to actuate them and in consequence laser 89 so as to emit laser beams therefrom. The aforementioned circuit does not always require the assembly of the circuits 85, 86 and 87 and AND gate 84.

As typically illustrated in FIG. 14, the output conversion circuits 78, 78' and identification electronic circuit 79 comprise multiple photo cells 90 which receive separately the bits of the optical pattern formed by coherent light beams from the optical memory 77 or 77' and convert them to electric signals. Output signals from the photo cell 90 are conducted to a flip-flop circuit 92 through an amplifier 91 and then to an AND gate 93. The other conversion circuit 78' which is of the same arrangement as 78 performs the same operation. Input signals to the conversion circuit 78' enter AND gates 93, which are actuated only when signals from both circuits 78 and 78' are supplied thereto. Output signals from said AND gates 93 are sent to the following AND gates 94, into which there are introduced clock pulses indicated by A, B and C of FIG. 14 which are displaced from each other in phase. When the supply of said pulses and output from the AND gate 93 are timed, output from the AND gate 94 is conducted to an OR circuit 95 where separate signals from the AND circuit 94 are converted to sequential signals.

There will now be described by reference to FIG. 12 as a typical illustration the manner in which there is processed optical information, according to the present invention, indicating its unique operation and effects which distinguish it from the prior art.

Referring to FIG. 12, character (a) is an input pattern. While the known Gabor's method requires said pattern to be consisted of coherent light beams, the present invention permits the pattern to be formed of incoherent light beams. The scope of information usable as the input is broad and general. Character (b) is a pattern of signals spatially quantized by the mask 73 of FIG. 11. The quantized pattern further passes through the incoherent-coherent pattern conversion means 76 and 76' of FIG. 11 which produce the patterns indicated by (c) and (c'), respectively. This is a process which has not been employed by the prior art. The coherent information patterns indicated by (c) and (c') are conducted to the holographic optical memories 77 and 77' of FIG. 11 respectively to obtain optical patterns (d) and (d').

These output patterns (d) and (d') have one bit lacking brightness in common (in FIG. 12, on the second row and fourth column, respectively). Detection of the position of said dark bit enables the type of input to be distinguished reversely from the program of the optical memory.

The mask 73 for spatial quantization interposed between the lenses 72 and 74 of FIG. 11 may be substituted by a similar mask disposed on the image plane of the incoherent-coherent pattern conversion means 76 and 76'.

According to FIG. 11, there was used a splitter 75 whereby there were separately provided a main train of units 76, 77 and 78 and a complement train of units 76', 77' and 78' and finally the outputs from these trains were subjected to an AND logical operation in the electronic circuit 79. However, it is possible to use instead a unit 96 of FIG. 15 performing an action of combined incoherent-coherent optical pattern conversion means 76 and 76', provide an electronic circuit 97 therefor and employ a unit 98 in which both holographic optical memories 77 and 77' of FIG. 11 are grouped into one. This arrangement will enable two optical machine language patterns to be so composed that the corresponding matrix elements can be superposed on a photoelectric conversion unit 99, thereby optically performing an AND logical operation. Accordingly, an electronic circuit 100 will simply act as a circuit for generating final electrical output signals. FIG. 16 illustrates a machine language pattern finally obtained by the aforementioned process which has already been subjected to an AND logical operation.

FIG. 17 shows that when a foreground object, for example, the letter A, is actually supplied as an input to an identification device, it will sometimes present variations such as (b), (c) and (d) from its normal pattern (a) due to positional displacement and thinning out during writing or entry thereof. In such a case, these inaccurate patterns may be processed as the other patterns by the same means and be finally gotten together in one group A.

What we claim is:

1. A digital optical pattern transformation system with optical memories comprising: an input information pre-processor for transforming input information to digital signals; a light source controller for emitting simultaneously multiple light beams corresponding to the digital signals; an optical memory device including a memory array which forms simultaneously multiple light patterns, each of which corresponds to each of said multiple light beams; and an output information detector for combining those of the read out patterns which are associated with each other so as to allow them to be mutually superposed and generating an output comprised to the corresponding digitalized parallel signals derived from said bit composition.

2. A system according to claim 1 wherein the light source controller comprises laser beam emitting elements arranged in the matrix form in a number of $m \times n$ to produce multiple coherent light beams; and the optical memory device comprises holograms set in the matrix form to cause plural optical patterns to be produced by irradiance of said multiple coherent light beams.

3. A system according to claim 1 wherein the input information pre-processor comprises means for forming the input information into an information carrier in which there are spatially arranged multiple optical gates with limited aperture; and the light source controller comprises a light source emitting light beam, whereby passage of the beam from said light source through the aperture of the information carrier provides multiple light beams.

4. A digital optical pattern transformation system with optical memories comprising: an input information pre-processor for receiving optical patterns comprised of incoherent light beams and generating digital electric signals according to the optical patterns received; a light source controller for producing multiple coherent light beams from light sources arranged in the matrix form in a number of $m \times n$ according to the digital electric signals from said pre-processor; an optical memory device for reconstructing plural data patterns from a memory array which includes multiple holograms arranged in the matrix form when there are projected multiple coherent light beams generated by the light source controller; and an output information detector for detecting the light intensity of each bit of the read out patterns produced by the optical memory array so as to cause the origins thereof to be superposed on each other and generating an electrical digital output information corresponding to said superposed optical output pattern.

5. A system according to claim 4 wherein an assembly of the input information pre-processor and light source controller includes a light source emitting an incoherent light beam; a foreground object formed into an information carrier adapted to be illuminated by said incoherent light beams; a lens for focusing light beams reflected from the foreground object which is recorded with an optical pattern; a mosaic device in which there are arranged multiple photoelectric conversion elements in the matrix form; means for converting the optical pattern to digital parallel electric signals; and a mosaic device in which there are arranged plural laser elements for generating multiple coherent light beams corresponding to said digital parallel electric signals.

6. A digital optical pattern transformation system with optical memories comprising an input information pre-processor for transforming input information to first digital signals and second digital signals constituting complements thereto; a light source controller comprised of multiple light sources arranged in the matrix form in a number of $m \times n$ for receiving the first and second digital signals and emitting from the light sources the first and second groups of light beams corresponding to both types of digital signals; an optical memory array comprised of multiple memory elements arranged in the matrix form for receiving the first and second groups of light beams and providing the first and second data patterns stored in said memories corresponding to the first and second light beams; and an output information detector for detecting the light intensity of each bit of those specified of the first and second patterns respectively generated by the optical memory array so as to cause them to be superposed on each other and producing a final electrical output information signal corresponding to each bit of said superposed output pattern.

7. A digital optical pattern transformation system with optical memories wherein the input information pre-processor comprises a light source projecting an incoherent light beam on a foreground object, a first lens for focusing an optical pattern reflected from the foreground object, a mask for quantizing the optical patterns, a second lens for focusing the quantized optical patterns from the mask, a beam splitter for producing two same optical patterns and photoelectric conversion means for detecting two optical patterns produced by the beam splitter and generating the first digital signals and the second digital signals constituting complements thereto; the light source controller comprises a first array of laser elements arranged in the matrix form to generate coherent light beams in response to the first signals, and a second array of laser beams emitting coherent light beams in response to the second signals similarly to said first array; the optical memory array comprises a first group of holograms illuminated by coherent light beams generated by the first array and a second group of holograms illuminated by coherent light beams produced by the second array; and the output information detector identifies by comparison the first digitalized output read out of the first group of holograms and the second digitalized output read out of the second group of holograms.

overload valve means connected to said conduit means wherein said overload valve means causes pre-pro-essor reduction in pressure during said overload condition.

12. In combination with a metal forming press having a frame and a press bed, a hydraulic control system for prestressing said frame and for providing overload protection for said press comprising: digitalized digitalized a first bearing means having an upper surface and a segmentally spherical lower surface wherein said lower side of said press bed rests on said upper surface of said first bearing means;

a second bearing means having an upper surface with a cavity therein and a lower surface wherein said lower surface of said second bearing means engages said frame;

a piston means operably positioned within said cavity of said second bearing means, said piston means having a lower surface an an upper surface, said upper surface having a cavity therein, and wherein said upper surface of said piston operably engages said segmentally spherical lower surface of said first bearing means;

a segmentally spherical third bearing means operably engaging the upper side of said press bed;

a fourth bearing means having an upper surface operably engaging said frame and a lower surface comprising a spherical cavity which is in operable engagement with said third bearing means wherein said frame is movably connected to said press bed;

a first hydraulic chamber, said first chamber being substantially formed by said lower surface of said first bearing means and by said upper surface of said piston means;

a second hydraulic chamber, said second chamber being substantially formed by said lower surface of said piston means and by said upper surface of said second bearing means;

a third hydraulic chamber connecting said first and second hydraulic chambers;

conduit means connected to said second chamber adapted to convey a liquid under pressure to said first and secone chambers, said fluid pressure being sufficien to carry the tonnage of said press during normal operation wherein said fluid pressure in said first chamber substantially supports said first bearing means thereby accommodatin slight movement of said press bed with respect to said frame and wherein said fluid pressure in said first and second chambers exerts a pressure on said first, second, third and fourth bearing means thereby prestressing said frame an causing said press bed to be secured to said frame; accumulator means connected to said conduit means for absorbing small changes in said fluid pressure due to momentary press overloads; an overload valve means connected to said conduit means wherein said overload control valve is adapted to reduce said fluid pressure during an overload condition of said press and wherein said fluid pressure is restored by said overload valve means when said overload condition is eliminated.

13. In combination with a metal forming press having a frame, a press bed, and a crankshaft, a hydraulic control system for prestressing said frame comprising:

a first bearing assembly means for movably connecting said frame to the lower side of said press bed;

a second bearing assembly means for movably connecting said frame to the upper side of said press bed;

piston means associated with said first bearing assembly means;

a first hydraulic chamber meano operably associated with said first bearing assembly means and substantially enclosing said piston means, said first hydraulic chamber beinj adapted to convey a fluid under pressure wherein said fluid pressure is sufficient to carry the tonnage of said press during normal operation and wherein said fluid pressure causes said first and second bearing assembly means to exert a pressure on said frame and said press bed thereby securely fastening said press bed to said frame;

a first bearing means rotatably connected to an encircling said crankshaft;

a third bearing assembly means for movably connecting the upper portion of said first bearing means to said frame;

a fourth bearing assembly means for movably connecting the lower portion of said first bearing means to said frame; ane second hydraulic chamber means operably associated with said third bearing assembly means, said second hydraulic chamber means being adapted to convey a fluid under pressure wherein said fluid pressure is sufficient to impose a load greater than the tonnage of said press wherein said fluid pressure causes said third and fourth bearing assembly means to exert a pressure on said first bearing means and said frame thereby securely supporting said crankshaft and securely fastening said first bearing means to said frame and wherein said pressures exerted in first and second hydraulic chamber means causes a prestressing of said frame thereby eliminating stress excursions of said frame.

14. In combination with a metal forming press having a crankshaft, a hydraulic control system comprising:

a first bearing means rotatably connected to and encircling said crankshaft;

a first bearing assembly means for movably connecting the upper portion of said first bearing means to said frame;

a second bearing assembly means for movably connecting the lower portion of said first bearing means to said frame; an hydraulic chamber means operably associated with said first bearing assembly means, said hydraulic chamber being adapted to convey a fluid under pressure wherein said fluid pressure is sufficient to impose a load greater than the tonnage of said press wherein said fluid pressure causes said first and second bearing assembly means to exert a pressure on said first bearing means and said frame thereby securely supporting said crankshaft and securely fastening said first bearing means to said frame.

15. The hydraulic control system of claim 14 wherein said first bearing assembly comprises:

a second bearing means having a lower surface with a cavity therein, said cavity being adapted to movably engage said upper portion of said first bearing means; an a third bearing means comprising an upper surface adapted to engage said frame and a lower surface having a cavity therein.

16. The hydraulic control system of claim 15 wherein said hydraulic chamber means comprises a chamber being substantially formed by said upper surface of said second bearing means and said lower surface of said third bearing means wherein said fluid under pressure causes said second bearing means and said second bearing assembly to prestress said frame.

* * * * *

PO-1050
(5/69)

UNITED STATES PATENT OFFICE
CERTIFICATE OF CORRECTION

Patent No. 3,668,635 Dated June 6, 1972

Inventor(s) Yasuo MIZOBUCHI, et al

It is certified that error appears in the above-identified patent and that said Letters Patent are hereby corrected as shown below:

Column 8, delete all lines beginning at line 34 through Column 10 last line.

Signed and sealed this 3rd day of October 1972.

(SEAL)
Attest:

EDWARD M.FLETCHER,JR.
Attesting Officer

ROBERT GOTTSCHALK
Commissioner of Patents